July 2, 1929.   L. CERINI   1,719,754
APPARATUS FOR THE PURIFICATION OF IMPURE SOLUTIONS OF
CAUSTIC SODA AND THE LIKE, ON OSMOTIC PRINCIPLES
Filed Jan. 7, 1927

Inventor:
L. Cerini
By Langner, Parry, Card & Langner
Attys.

Patented July 2, 1929.

1,719,754

UNITED STATES PATENT OFFICE.

LEONARDO CERINI, OF CASTELLANZA, MILAN, ITALY.

APPARATUS FOR THE PURIFICATION OF IMPURE SOLUTIONS OF CAUSTIC SODA AND THE LIKE, ON OSMOTIC PRINCIPLES.

Application filed January 7, 1927, Serial No. 159,704, and in Italy January 29, 1926.

Various methods have already been suggested for the purification of solutions of caustic soda which are derived from the treatment of viscose and which contain organic substances, but none of these methods has up to the present been practically applied in industry, either owing to their imperfections, or to the excessive cost of the processes and the plant required therefor.

In the drawings Figure 1 is a longitudinal section through the reservoir.

Figure 1:
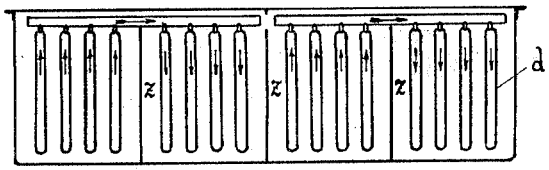
Figure 2:
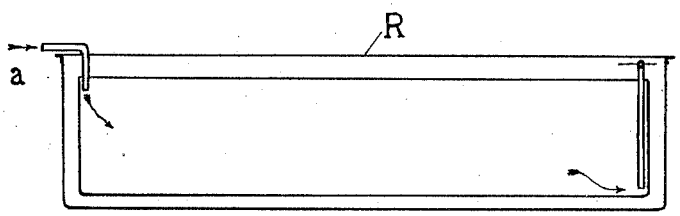
Figure 2 is a section through the reservoir taken at right angles to the view shown in Figure 1 and showing a longitudinal section through one of the cells.
Figure 3:
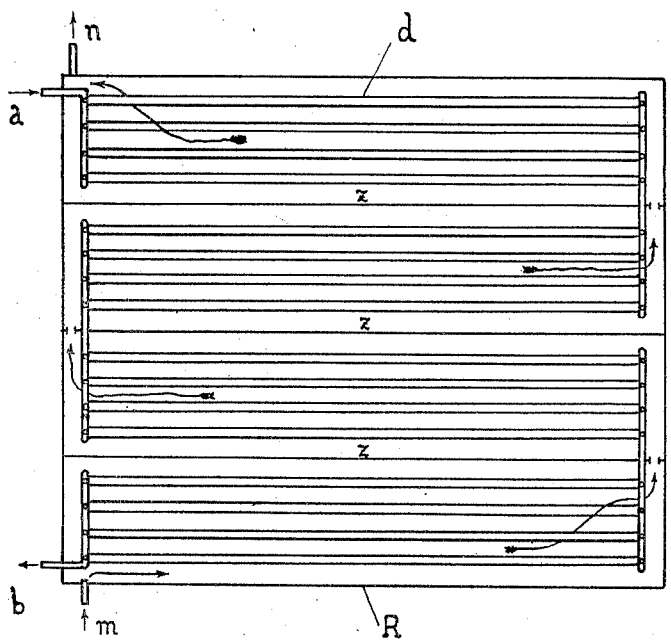
Figure 3 is a plan view of the reservoir.
Figure 4:
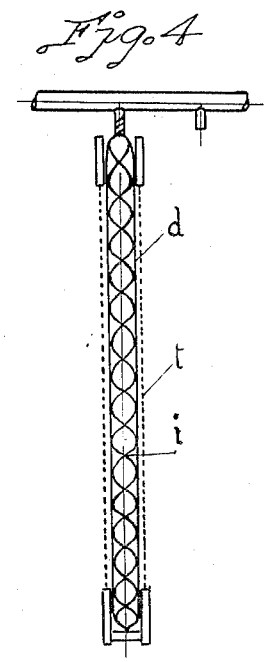
Figure 4 is a cross section through one of the cells.

Referring now in detail to the several figures, the reservoir is represented by —R—, in which reservoir there is contained the impure solution of caustic soda, and —d— represents the diaphragms. The inlet pipe of the impure solution is shown at —m— while the outlet pipe or discharge opening for the impure solution is shown at —n—. The pure solution is admitted through the inlet pipe —a— and discharges through the outlet pipe —b—. The vertical semi-permeable walls are represented by —z—. The frames surrounding or enclosing the various diaphragms are represented by —t— while the rigid metallic supports for the sacks are indicated at —i—. The supports while shown in the drawings as disposed internally of the sacks may obviously also be disposed externally thereof. In the various views the arrows indicate the directions of the currents of pure and impure solutions respectively.

Seeing that the impurities in these solutions of soda are constituted by colloidal substances, the use of osmosis is rational, as it is possible to absorb the hydrate of soda by means of osmotic diaphragms and to leave all the organic substances in the impure solution. The practical use of this principle is however attended by difficulties of two kinds which have hitherto been insurmountable and are:
1.—The construction of the plant in which it is practically impossible to obtain tight compartments by the aid of very delicate materials. 2.—The nature of the diaphrams used which being constructed of artificial parchment (parchment papers or parchment fabrics as described in United States Patent No. 1,573,703) or a similar material, offers no security and resistance as is necessary for continuous working.

By the aid of the apparatus and the materials which form the subject matter of the present invention, these difficulties have been satisfactorily surmounted and a continuous process devised which can be carried out on an industrial scale and is of perfect efficiency.

The apparatus is constituted by a series of receptacles or reservoirs of iron, of suitable form and structure in which are arranged vertical partitions which divide them into parallel compartments of variable width and which communicate with each other. In these compartments is contained the solution to be purified which is fed in continuously at one end of the reservoir and passes through all the compartments in turn to the opposite end where it is discharged.

In each of the said compartments is placed a variable number of diaphragms, which are independent of the iron reservoirs and have semi-permeable walls, constructed as hereinafter described, and arranged vertically in parallel and connected together at the ends so as to form a single conduit. Each set of diaphragms communicates in its turn with the set contained in the adjoining compartment. A long fluid tight course is thus obtained over which water is caused to trickle in a direction opposite to the direction of flow of the solution of caustic soda.

Each diaphragm is constituted by two semi-permeable walls, turned towards each other and completely closed along their edges so as to form a long tubular bag or sack provided with openings at the ends and perfectly fluid tight being kept rigid by means of a fillet or other metallic support either internally or externally or by other devices or means. The semi-permeable walls are constructed of fabrics composed of vegetable fibre (such as cotton, linen, hemp or the like for example) mercerized by the action of alkalies.

By the aid of the apparatus and the diaphragms herein described it is possible to conduct the two solutions in two currents in opposite directions, having two courses which are entirely independent so that the exhaustion of the impure solution on one side and the enrichment of the pure solution on the other side are accomplished in the simplest, most rational and most complete manner.

The dialyzing diaphragms constructed of cotton fabrics or other vegetable fibres as above described, may be advantageously prepared by a process which consists in mercerizing the fabrics by an alkali, which for example may be a concentrated solution of caustic soda.

It is also possible to employ for this purpose a fabric of vegetable fibres in natural state, as after any little time this fabric has been in touch with the alkaline liquors, it will be mercerized and come in the conditions of my invention.

The mercerization permits of very strong diaphragms being obtained which are of perfect efficiency and illimitable efficacy in contradistinction to all other diaphragms prepared differently and which offer a minimum amount of strength and very limited efficacy.

The dialyzing diaphragms may be kept rigid and their transverse section therefore rendered incapable of deformation by making seams by means of cotton, linen or hempen thread or the like along the edges so as to close the bags or sacks and also across their sides. These seams are so disposed and distributed that the interior of the bags or sacks into which the aqueous solution trickles is sub-divided into various conduits or compartments communicating with each other and with the inlet and outlet openings.

I claim:—

1. A cell for segregating a body of solvent for sodium hydroxide from a body of sodium hydroxide solution contaminated with colloidal substances, in the recovery of said sodium hydroxide, comprising a sack of mercerized woven textile fabric adapted to contain one of said bodies for permitting dialytic action between said bodies.

2. A cell for segregating a body of solvent for sodium hydroxide from a body of sodium hydroxide solution contaminated with colloidal substances, in the recovery of said sodium hydroxide, comprising a sack adapted to contain one of said bodies formed of dialytic diaphragms of mercerized woven textile fabric joined at the peripheral edges by seams.

3. A cell for segregating a body of solvent for sodium hydroxide from a body of sodium hydroxide solution contaminated with colloidal substances, in the recovery of sodium hydroxide, comprising a sack adapted to contain one of said bodies, formed of dialytic diaphragms of mercerized woven textile fabric joined at their peripheral edge by seams and provided with seams uniting the sides of said sack at intermediate portions, to form a plurality of communicating conduits in said sack.

4. In the process for the dialytic recovery of sodium hydroxide from a solution of the same containing colloidal impurities, the use of a dialytic separator, segregating the body of solution to be purified, from a body of solvent for sodium hydroxide, comprising a diaphragm of mercerized woven textile fabric.

In testimony whereof I affix my signature.

LEONARDO CERINI.